(12) United States Patent
Cok

(10) Patent No.: US 9,052,788 B2
(45) Date of Patent: Jun. 9, 2015

(54) TOUCH DETECTION FOR CAPACITIVE TOUCH SCREEN

(75) Inventor: Ronald Steven Cok, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 274 days.

(21) Appl. No.: 13/609,299

(22) Filed: Sep. 11, 2012

(65) Prior Publication Data

US 2014/0071080 A1   Mar. 13, 2014

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0418* (2013.01); *G06F 2203/04112* (2013.01)

(58) Field of Classification Search
CPC ....................................................... G06F 3/044
See application file for complete search history.

(56) References Cited

U.S. PATENT DOCUMENTS

| | | |
|---|---|---|
| 3,223,525 A | 12/1965 | Honker et al. |
| 7,663,607 B2 | 2/2010 | Hoetlling et al. |
| 8,040,142 B1 | 10/2011 | Bokma et al. |
| 2010/0026664 A1 | 2/2010 | Geaghan |
| 2010/0244859 A1 | 9/2010 | Cormier, Jr. et al. |
| 2011/0007011 A1 | 1/2011 | Mozdzyn |
| 2011/0099805 A1 | 5/2011 | Lee |
| 2011/0248955 A1 | 10/2011 | Mo et al. |
| 2011/0289771 A1 | 12/2011 | Kuriki |
| 2011/0291966 A1 | 12/2011 | Takao et al. |
| 2012/0043976 A1 | 2/2012 | Bokma et al. |
| 2012/0113047 A1* | 5/2012 | Hanauer et al. ............... 345/174 |
| 2012/0212240 A1* | 8/2012 | Young ........................... 324/679 |

* cited by examiner

*Primary Examiner* — Kenneth B Lee, Jr.
(74) *Attorney, Agent, or Firm* — Raymond L. Owens

(57) ABSTRACT

A touch-screen device includes a transparent dielectric layer. A plurality of first electrodes is located over the transparent dielectric layer. A plurality of second electrodes is located under the transparent dielectric layer so that the first electrodes overlap the second electrodes to form an array of capacitors. A controller provides electrical signals to the first and second electrodes to energize and measure the baseline capacitance and repeatedly energize and measure the present capacitance of each capacitor. The controller calculates a ratio function between the present capacitance and the corresponding stored baseline capacitance for each capacitor and provides a touch signal when the ratio function exceeds a predetermined threshold value.

19 Claims, 14 Drawing Sheets

TOUCH DETECTION FOR CAPACITIVE TOUCH SCREEN

CROSS REFERENCE TO RELATED APPLICATIONS

Reference is made to commonly assigned U.S. patent application Ser. No. 13/571,704 filed Aug. 10, 2012 entitled Micro-Wire Electrode Pattern, by Ronald S. Cok, the disclosure of which is incorporated herein.

FIELD OF THE INVENTION

The present invention relates to control and calibration of capacitors in capacitive touch screens.

BACKGROUND OF THE INVENTION

Touch screens use a variety of technologies, including resistive, inductive, capacitive, acoustic, piezoelectric, and optical technologies. Such technologies and their application in combination with displays to provide interactive control of a processor and software programs are well known in the art. Capacitive touch-screens are of at least two different types: self-capacitive and mutual-capacitive. Self-capacitive touch-screens employ an array of transparent electrodes, each of which in combination with a touching device (e.g. a finger or conductive stylus) forms a temporary capacitor whose capacitance is detected. Mutual-capacitive touch-screens can employ an array of transparent electrode pairs that form capacitors whose capacitance is affected by a conductive touching device. In either case, each capacitor in the array is tested to detect a touch and the physical location of the touch-detecting electrode in the touch-screen corresponds to the location of the touch. For example, U.S. Pat. No. 7,663,607 discloses a multipoint touch-screen having a transparent capacitive sensing medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitive touch-screens.

Referring to FIG. 10, a prior-art display and touch-screen system 100 includes a display 110 with a corresponding touch screen 120 mounted with display 110 so that information displayed on display 110 is viewed through touch screen 120. Graphic elements displayed on display 110 are selected, indicated, or manipulated by touching a corresponding location on touch screen 120. Touch screen 120 includes a first transparent substrate 122 with first transparent electrodes 130 formed in the x dimension on the first transparent substrate 122 and a second transparent substrate 126 with second transparent electrodes 132 formed in the y dimension facing the x-dimension first transparent electrodes 130 on the second transparent substrate 126. A transparent dielectric layer 124 is located between first and second transparent substrates 122, 126 and first and second transparent electrodes 130, 132. Referring also to the plan view of FIG. 11, in this example first pad areas 128 in first transparent electrodes 130 are located adjacent to second pad areas 129 in second transparent electrodes 132. (The first and second pad areas 128, 129 are separated into different parallel planes by transparent dielectric layer 124.) The first and second transparent electrodes 130, 132 have a variable width and extend in orthogonal directions (for example as shown in U.S. Patent Publication Nos. 2011/0289771 and 2011/0099805). When a voltage is applied across first and second transparent electrodes 130, 132, electric fields are formed between first pad areas 128 of x-dimension first transparent electrodes 130 and second pad areas 129 of y-dimension second transparent electrodes 132.

A display controller 142 (FIG. 10) connected through electrical buss connections 136 controls display 110 in cooperation with a touch-screen controller 140. Touch-screen controller 140 is connected through electrical buss connections 136 and wires 134 and controls touch screen 120. Touch-screen controller 140 detects touches on the touch screen 120 by sequentially electrically energizing and testing x-dimension first and y-dimension second transparent electrodes 130, 132.

Referring to FIG. 12, in another prior-art embodiment, rectangular first and second transparent electrodes 130, 132 are arranged orthogonally on first and second transparent substrates 122, 126 with intervening transparent dielectric layer 124, forming touch screen 120 which, in combination with the display 110 forms touch-screen and display system 100. First and second pad areas 128, 129 are formed where first and second transparent electrodes 130, 132 overlap. Touch screen 120 and display 110 are controlled by touch screen and display controllers 140, 142, respectively, through electrical buss connections 136 and wires 134.

Since touch-screens are largely transparent, any electrically conductive materials located in the transparent portion of the touch-screen either employ transparent conductive materials or employ conductive elements that are too small to be readily resolved by the eye of a touch-screen user. Transparent conductive metal oxides are well known in the display and touch-screen industries and have a number of disadvantages, including limited transparency and conductivity and a tendency to crack under mechanical or environmental stress. Typical prior-art conductive electrode materials include conductive metal oxides such as indium tin oxide (ITO) or very thin layers of metal, for example silver or aluminum or metal alloys including silver or aluminum. These materials are coated, for example, by sputtering or vapor deposition, and are patterned on display or touch-screen substrates, such as glass. However, the current-carrying capacity of such electrodes is limited, thereby limiting the amount of power that is supplied to the pixel elements. Moreover, the substrate materials are limited by the electrode material deposition process (e.g. sputtering). Thicker layers of metal oxides or metals increase conductivity but reduce the transparency of the electrodes.

Touch-screens, including very fine patterns of conductive elements, such as metal wires or conductive traces are known. For example, U.S. Patent Publication No. 2011/0007011 teaches a capacitive touch screen with a mesh electrode, as does U.S. Patent Publication No. 2010/0026664. Referring to FIG. 13, a prior-art x- or y-dimension first or second variable-width transparent electrode 130, 132 includes a micro-pattern 156 of micro-wires 150 arranged in a rectangular grid. Micro-wires 150 are multiple, very thin metal conductive traces or wires formed on the first and second transparent substrates 122, 126 (not shown in FIG. 13) to form the x- or y-dimension first or second transparent electrodes 130, 132. Micro-wires 150 are so narrow that they are not readily visible to a human observer, for example 1 to 10 microns wide. Micro-wires 150 are typically opaque and spaced apart, for example by 50 to 500 microns, so that first or second transparent electrodes 130, 132 appear to be transparent and micro-wires 150 are not distinguished by an observer.

U.S. Patent Application Publication No. 2011/0291966 discloses an array of diamond-shaped micro-wire structures. In this disclosure, a first electrode includes a plurality of first conductor lines inclined at a predetermined angle in clockwise and counterclockwise directions with respect to a first direction and provided at a predetermined interval to form a grid-shaped pattern. A second electrode includes a plurality of second conductor lines, inclined at the predetermined angle in clockwise and counterclockwise directions with respect to a second direction, the second direction perpendicular to the first direction and provided at the predetermined interval to form a grid-shaped pattern. This arrangement is used to inhibit Moiré patterns. The electrodes are used in a touch screen device. Referring to FIG. 14, this prior-art design includes micro-wires 150 arranged in a micro-pattern 156 with micro-wires 150 oriented at an angle to the direction of horizontal first transparent electrodes 130 and vertical second transparent electrodes 132.

Manufacturing techniques for capacitive touch screens having either transparent conductive oxide electrodes or electrodes with fine patterns of conductive metal wires are known. These techniques inevitably have a manufacturing variability that causes a performance variation. Furthermore, when in use, the performance of capacitive touch screens can vary due to use conditions or wear. For example, transparent conductive oxides are known to crack under mechanical stress, which reduces the conductivity of the materials.

A variety of calibration and control techniques for capacitive touch screens are taught in the prior art. U.S. Patent Application Publication No. 2011/0248955 discloses a touch detection method and circuit for capacitive touch panels. The touch detection method for capacitive touch panels includes scanning the rows and columns of the capacitive matrix of a touch panel respectively, wherein during the scanning of the rows or columns of the capacitive matrix of the touch panel, two rows or columns are synchronously scanned at the same time to obtain the capacitance differential value between the two rows or columns, or one row or column is scanned at the same time to obtain the capacitance differential value between the row or column and a reference capacitance; and then processing the obtained capacitance differential value.

U.S. Patent Application Publication No. 2010/0244859 teaches a capacitance measuring system including analog-digital calibration circuitry that subtracts baseline capacitance measurements from touch-induced capacitance measurements to produce capacitance change values.

U.S. Pat. No. 8,040,142 discloses touch detection techniques for capacitive touch sense systems that include measuring a capacitance value of a capacitance sensor within a capacitance sense interface to produce a measured capacitance value. The measured capacitance value is analyzed to determine a baseline capacitance value for the capacitance sensor. The baseline capacitance value is updated based at least in part upon a weighted moving average of the measured capacitance value. The measured capacitance value is analyzed to determine whether the capacitance sensor was activated during a startup phase and to adjust the baseline capacitance value in response to determining that the capacitance sensor was activated during the startup phase.

U.S. Patent Application Publication No. 2012/0043976 teaches a technique for recognizing and rejecting false activation events related to a capacitance sense interface includes measuring a capacitance value of a capacitance sense element. The measured capacitance value is analyzed to determine a baseline capacitance value for the capacitance sensor. The capacitance sense interface monitors a rate of change of the measured capacitance values and rejects an activation of the capacitance sense element as a non-touch event when the rate of change of the measured capacitance values have a magnitude greater than a threshold value, indicative of a maximum rate of change of a touch event.

Baseline capacitance measurements are useful for initial calibration but are sensitive to problems of drift in the measured baseline values. Absolute difference values can be misleading in the presence of changes in capacitors, for example through wear. Although rate-of-change measurements are useful to reject false activation, they do not address problems with signal-to-noise ratio in performance variability due to manufacturing variability or performance changes due to wear. There is a need, therefore, for improved measurement methods for detecting touches with a capacitive touch screens.

SUMMARY OF THE INVENTION

In accordance with the present invention, a touch-screen device comprises:

a transparent dielectric layer having a first side and a second side opposite and substantially parallel to the first side;

a plurality of first electrodes extending in a first length direction located over the first side, a plurality of second electrodes having a second length direction different from the first length direction located under the second side so that the first electrodes overlap the second electrodes to form an array of capacitors;

a controller having a memory and circuits that provide electrical signals to the first and second electrodes, the circuits performing the following functions:

energizing each capacitor, measuring the baseline capacitance of each capacitor, and storing the baseline capacitance of each capacitor in the memory; and repeatedly energizing each capacitor and measuring the present capacitance of each capacitor; and the controller calculating a ratio function between the present capacitance and the corresponding stored baseline capacitance for each capacitor and providing a touch signal when the ratio function exceeds a predetermined threshold value.

The present invention provides a device and method for improving touch detection for capacitive touch screen in the presence of manufacturing variability and performance changes due to use.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein.

DETAILED DESCRIPTION OF THE INVENTION

Figure 1:
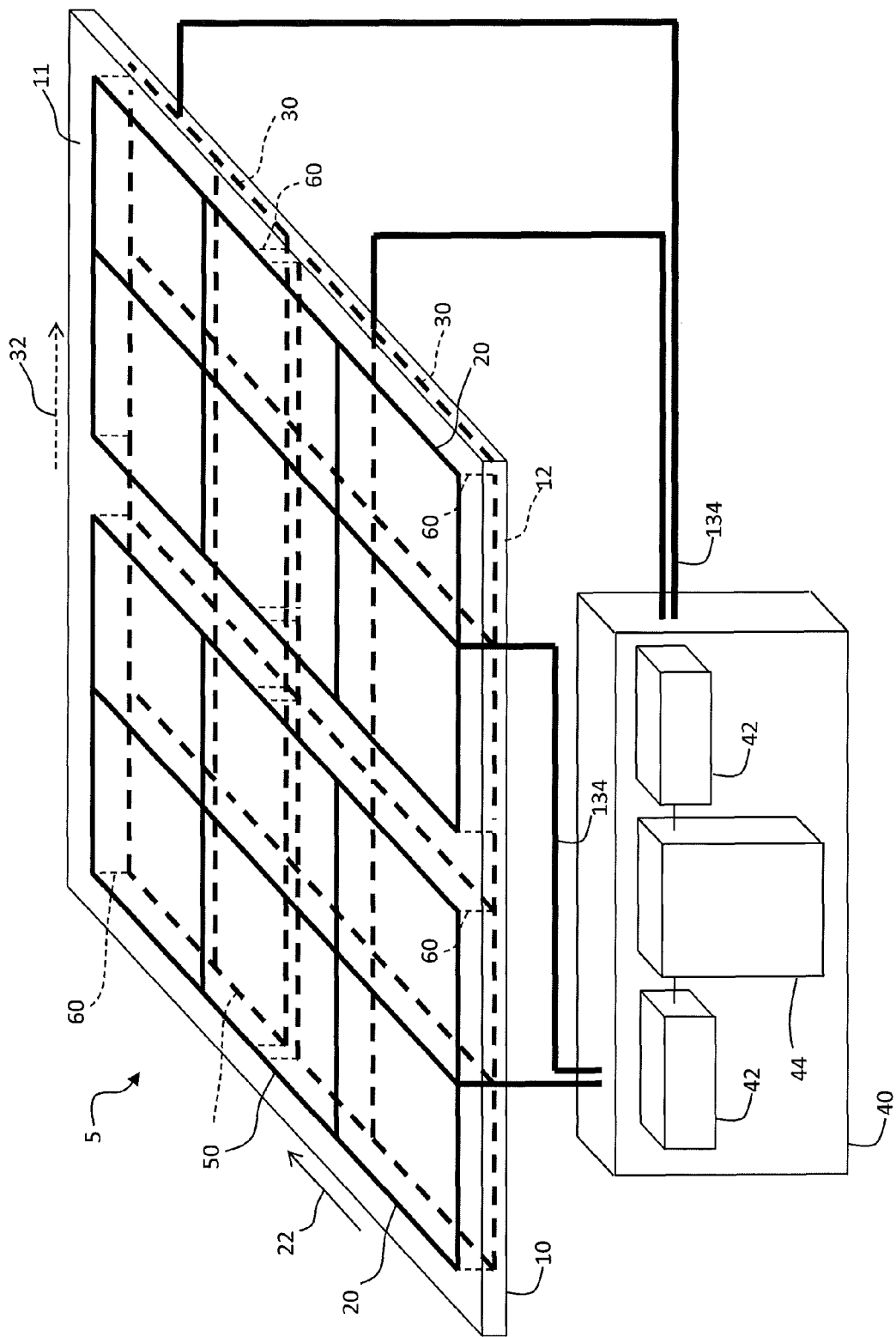
FIG. 1 is a perspective illustrating an embodiment of the present invention.

Referring to FIG. 1, in an embodiment of the present invention, a touch-screen device 5 includes a transparent dielectric layer 10 having a first side 11 and a second side 12 opposite and substantially parallel to the first side 11. A plurality of first electrodes 20 extending in a first length direction 22 is located over first side 11. A plurality of second electrodes 30 having a second length direction 32 different from first length direction 22 is located under second side 12 so that first electrodes 20 overlap second electrodes 30 to form an array of capacitors 60. First electrodes 20 are orthogonal to second electrode 30 and first and second electrodes 20, 30 can be transparent, or apparently transparent.

Four capacitors 60 are indicated in FIG. 1 with dashed lines projecting from first electrode 20 to second electrode 30 in the areas of overlap between first and second electrodes 20, 30. In FIG. 1, two first electrodes 20 are formed in the vertical first length direction 22 over transparent dielectric layer 10 and two second electrodes 30 are formed in the horizontal second length direction 32 under transparent dielectric layer 10. The overlap of the first and second electrodes 20, 30 therefore forms a two-by-two array of capacitors 60. First electrode 20 located over transparent dielectric layer 10 is shown with solid lines while second electrode 30 located under transparent dielectric layer 10 is shown with dashed lines, as are capacitors 60.

A controller 40 having a memory 44 and circuits 42 provides electrical signals to first and second electrodes 20, 30. The electrical signals can drive first and second electrodes 20, 30 and also respond to first and second electrodes 20, 30 through wires 134. Circuits 42 energize each capacitor 60 and measure the baseline capacitance of each capacitor 60 through first and second electrodes 20, 30. The measured baseline capacitance of each capacitor 60 is stored in memory 44. Circuits 42 repeatedly energize each capacitor 60 and measure the present capacitance of each capacitor 60 through first and second electrodes 20, 30. Controller 40 calculates a ratio function between the present capacitance and the corresponding stored baseline capacitance for each capacitor 60 and provides a touch signal when the ratio function exceeds a predetermined threshold value. The baseline capacitance is measured the same way as is the present capacitance except that the baseline capacitance is measured as a calibration step for touch-screen device 5 when no touches are expected.

The ratio function is a mathematical operation performed upon a ratio of the baseline capacitance and the present capacitance, for example a ratio derived by dividing one by the other. In embodiments, either the baseline capacitance is divided by the present capacitance or the present capacitance is divided by the baseline capacitance. The ratio function can include other operations, for example adding or subtracting constants or employing other multipliers or dividers, or other geometric or arithmetic functional transforms including inversion. As described herein, the ratio function is compared to a threshold value and a touch detected if the ratio function exceeds the threshold value. However, as will be appreciated by those skilled in mathematics, the ratio function can be inverted so that an equivalent operation is performed by detecting if the ratio function is less than a threshold value. The present invention includes touch determinations both when the ratio function exceeds a threshold value and when the ratio function is less than a threshold value. The description of less than or greater than a threshold value is arbitrary and used for convenience and a less than comparison can be exchanged with a greater than comparison without limiting the scope of the present invention. The term "ratio function" as used herein can also mean the value of the ratio function when applied to input parameters including a ratio of the baseline capacitance and present capacitance.

Furthermore, as used herein, a touch can be indicated with a ratio function that is greater than the predetermined threshold value or that is greater than or equal to the predetermined threshold value. The phrase "greater than" is used for concision and the invention includes comparisons that are greater than or greater than or equal to. Likewise, as discussed below, the phrase "less than" is used for concision and the invention includes comparisons that are less than or less than or equal to.

Transparent dielectric layers 10 with opposing parallel first and second sides 11, 12 can include substrates made of, for example, glass or polymers and are known in the art. Such transparent dielectric layers 10 can be, for example, 10 microns-1 mm thick, or more, for example 1-5 mm thick; the present invention is not limited to any particular thickness. First and second electrodes 20, 30 are, for example, formed on opposing sides of transparent dielectric layer 10 using photolithographic methods known in the art, for example sputtering, patterned coating, or unpatterned coating followed by coating with photosensitive material that is subsequently patterned with light, patterned removal, and etching.

First and second electrodes 20, 30 can be formed on transparent dielectric layer 10, on layers formed on transparent dielectric layer 10, or on other substrates (not shown) arranged to locate first electrode 20 over first side 11 of transparent dielectric layer 10 and second electrode 30 under second side 12 of transparent dielectric layer 10. First and second electrodes 20, 30 can include, for example, materials such as transparent conductive oxides, thin metal layers, or patterned metal micro-wires. Materials, deposition, and patterning methods for forming electrodes on dielectric substrates are known in the art and can be employed in concert with the present invention.

First length direction 22 of first electrode 20 or second length direction 32 of second electrode 30 is typically the direction of the greatest spatial extent of corresponding first or second electrode 20, 30 over, on, or under a side of transparent dielectric layer 10 (e.g. first side 11 or second side 12). Electrodes formed on or over substrates are typically rectangular in shape, or formed of rectangular elements, with a length and a width, and the length is much greater than the width. See, for example, the prior-art illustrations of FIG. 12. In any case, first or second length direction 22, 32 can be selected to be a direction of desired greatest extent of first or second electrode 20, 30 respectively. Electrodes are generally used to conduct electricity from a first point on a substrate to a second point and the direction of the electrode from the first point to the second point can be the length direction.

Controller 40 can be a digital or analog controller 40, for example a touch-screen controller, can include a processor, logic circuits, programmable logic arrays, one or more integrated or discrete circuits on one or more printed circuit boards, or other computational and control elements providing circuits 42 and a memory 44 and can include software programs or firmware. The electrical signals are, for example, electronic analog or digital signals. Signals can be measured as analog values and converted to digital values. Signals can be, for example, current values or voltage values. Such control, storage, computational, and signaling devices, circuits, and memories are known in the art and can be employed with the present invention.

Capacitors 60 are formed where first and second electrodes 20, 30 overlap and store charge when energized, for example by providing a voltage differential across first and second electrodes 20, 30. The charge for each capacitor 60 can be measured using circuits 42 in controller 40 and the measured capacitance value stored in memory 44. By repeatedly providing a voltage differential across first and second electrodes 20, 30 and measuring it, the capacitance of capacitors 60 are repeatedly measured over time. Time-base circuits, such as clocks, are well known in the computing arts and can be employed here. For example, a clock signal, as well as other control signals, is supplied to controller 40.

The initial capacitance measurement of each capacitor 60 is taken, for example when touch-screen device 5 is manufactured or the first time touch-screen device 5 is powered up in the absence of any external conductive element, for example a finger or conductive stylus. This initial capacitance measurement provides a baseline capacitance measurement against which subsequent capacitance measurements are made to identify differences in capacitance that can indicate a touch. Such control methods and circuits are well known in the display and touch screen industries and can be applied here. The subsequent capacitance measurements are identified as present capacitance measurements as they are taken in the present, i.e. in real-time when touch-screen device 5 is in use. The present capacitance measurements are taken repeatedly and can be taken periodically as controlled by a clock signal. Touch-screen device 5 can, when no changes in capacitance are detected (i.e. no touches are detected) over a length of time, power down and cease operation until some other event occurs that causes controller 40 to again measure the capacitor 60 capacitance.

Figure 2:
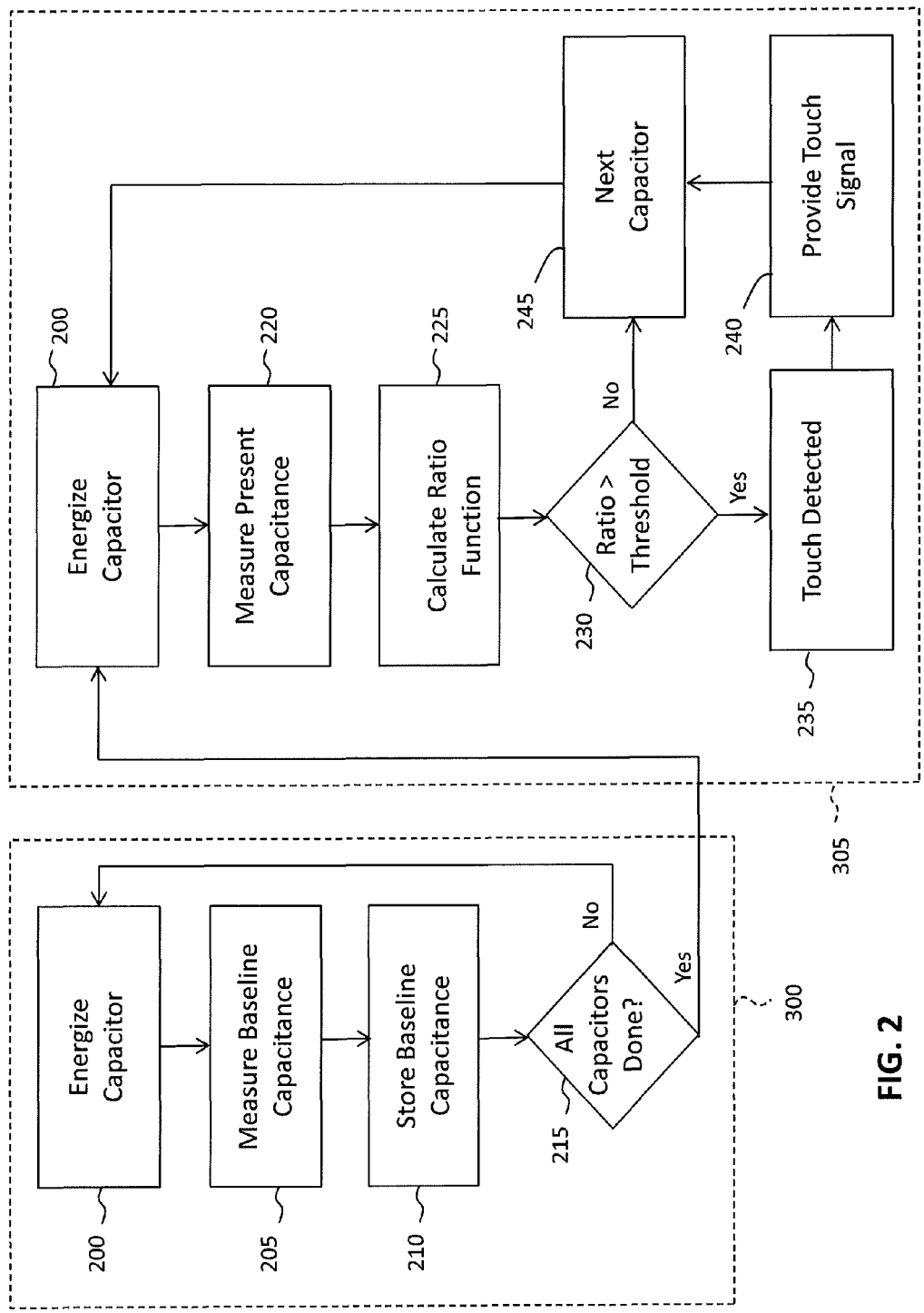
FIGS. 2-6 are flow diagrams illustrating various embodiments of the present invention.

Referring to FIG. 2, capacitors 60 are energized 200 by providing power to first and second electrodes 20, 30 and the initial baseline capacitance is measured 205 and stored 210 by controller 40, circuits 42 and memory 44 for each capacitor 60. A test is performed 215 to ensure that the capacitance of capacitors 60 is measured. If not, the capacitance of remaining capacitors 60 is measured. If so, capacitors 60 are energized 200 again and the present capacitance measured 220 for each capacitor 60. Controller 40 calculates 225 a ratio function incorporating a ratio of the baseline and present capacitance. A separate ratio function is calculated for each capacitor 60. The baseline capacitance for each capacitor 60 is found by accessing memory 44 and retrieving the baseline capacitance value, for example by providing an address for each capacitor 60 and using the address to store the measured baseline capacitance corresponding to the addressed capacitor 60. Present capacitance values for each capacitor 60 can also be stored. Methods and circuits for storing and accessing data and using lookup tables are well known in the digital computing arts.

The calculated ratio function for each capacitor 60 is tested 230 by comparing the calculated ratio function to a predetermined threshold value. If the predetermined threshold value is exceeded, a touch is detected 235 and a touch signal provided 240 by controller 40, for example to a display controller (e.g. display controller 142 in FIG. 10) or computer. The process is then repeated 245 for a next capacitor 60. The process for repeatedly measuring capacitance for a capacitive touch-screen (e.g. touch-screen device 5) is well known and processes and circuits to repeatedly test and measure the capacitance of arrays of capacitors 60 are well known.

Figure 3:
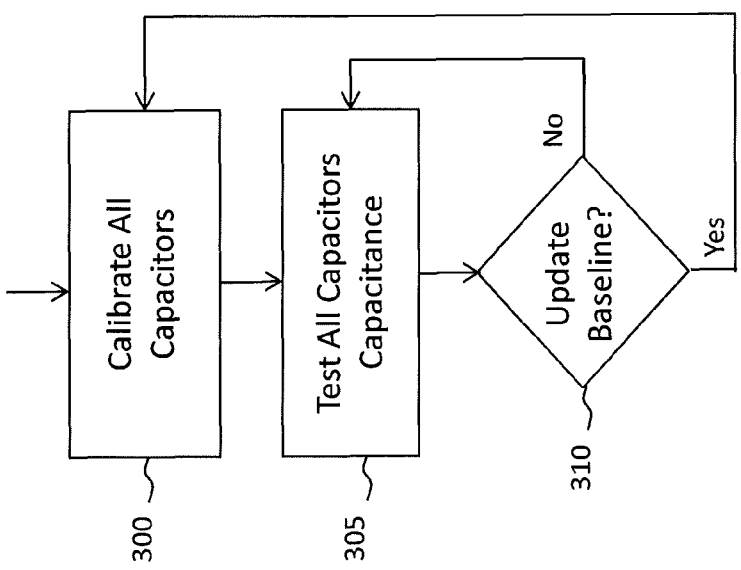

Steps 200-215 of FIG. 2 can be considered to make up a calibration step 300 while steps 220-245 make up an operation step 305. Referring further to FIG. 3, calibration step 300 can be repeated after one or more operation steps 305. For example, a clock signal can periodically interrupt operational step 305 to test 310 if the baseline capacitance measurements should be updated. If not, operational steps 305 recommence. If so, calibration process 300 (FIG. 2) is repeated. Calibration process 300 can be repeated for a variety of reasons, for example periodically, to avoid drift in the capacitance measurements, in response to the presence of environmental or use changes, or in response to operation of the device elements such as first or second electrodes 20, 30 due to use. Thus, circuits 42 repeatedly energize 200 each capacitor 60, measure 205 an updated capacitance of each capacitor 60, and store 210 the updated baseline capacitance in the memory 44. The updated baseline capacitance values are then used to calculate the ratio function used in subsequent touch determinations 235. A history of baseline values can be maintained in the memory 44.

Figure 4:
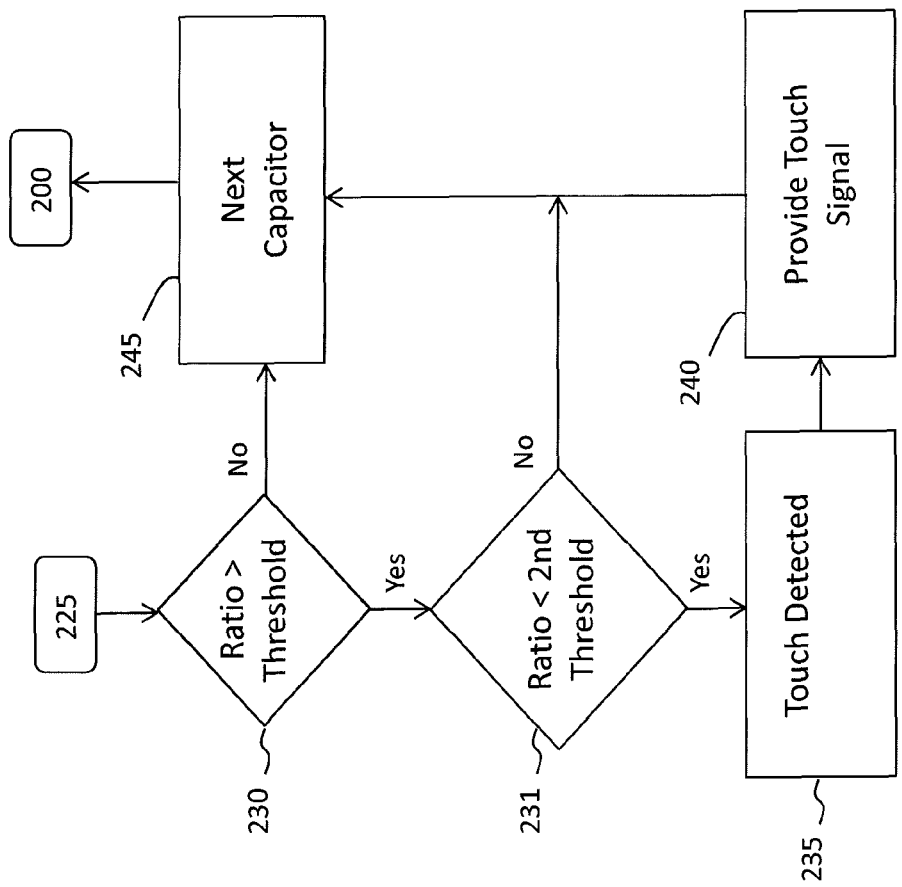

In actual use, the measured present capacitance values can be noisy and false positive or false negative touch determinations made. To avoid such false signals, referring to FIG. 4 in another embodiment, the ratio function indicating a touch can be limited to a range such that the ratio function can be greater than the predetermined threshold value but also less than a second predetermined threshold value that is greater than the predetermined value. Thus, the process for determining a touch includes calculating the ratio function (step 225 in FIG. 2), testing 230 the ratio function against the predetermined threshold value (e.g. by a comparison), and then testing 231 the ratio function against a second predetermined threshold value (e.g. by a comparison). Only if both tests are positive is a touch detected 235 and a touch signal provided 240 by the controller 40. Once a capacitor 60 is measured and its capacitance measured, a ratio function calculated and touch determined, the next capacitor 60 can be tested 245. By requiring two comparisons within a threshold range to determine a touch, voltage spikes or false positives from other anomalous signals can be avoided.

Figure 5:
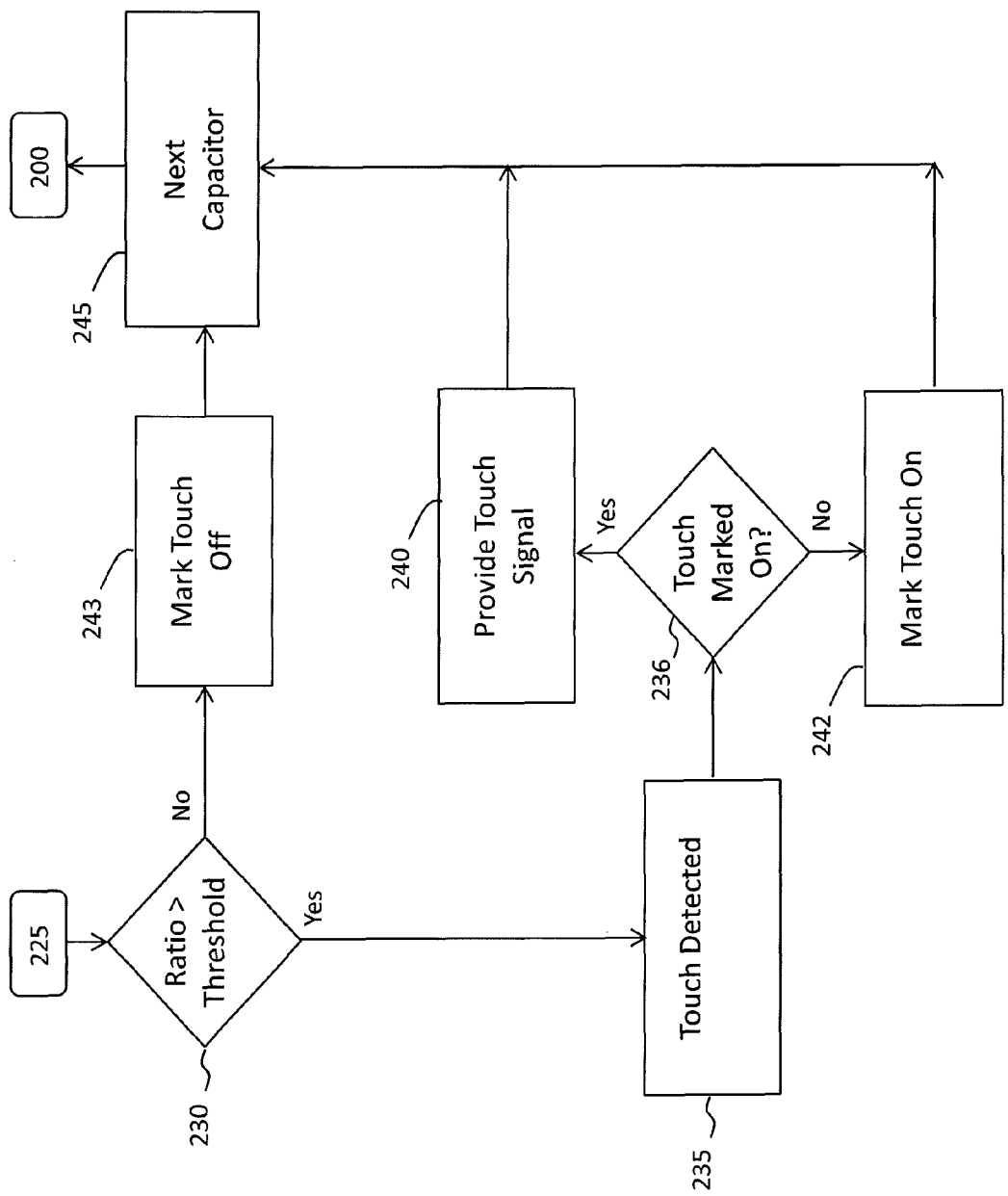

Referring to FIG. 5, in another embodiment of the present invention, two subsequent capacitor 60 measurements are tested twice sequentially. A first ratio function is tested 230 and if the result is negative, a touch value is marked 243 as "touch off" (e.g. a Boolean data value in a computer program is assigned to a negative or zero value). If the result is positive, a touch is detected 235 but the touch value is tested 236 to determine if a prior touch was detected. If the touch value is positive, a prior touch is assumed, the touch signal is provided 240 and the next capacitor 60 tested 245. If the touch value is negative, a prior touch is not assumed, the touch value is marked 242 as "touch on" (e.g. a Boolean data value in a computer program is assigned to a positive or one value) and the next capacitor 60 is tested 245 but no touch signal is provided (i.e. step 240 is not performed). Such an algorithm is performed by a processor executing a software program or firmware, or by a logic state machine. Such devices capable of performing the algorithm of FIG. 5 are known in the art.

By requiring that a touch be detected twice sequentially, spurious, intermittent or too-short touches are ignored. A delay can be implemented within the process to require that a certain length of time, for example one millisecond, elapse before a touch signal is provided. Alternatively or in addition, more than two sequential touches are detected before a touch signal is provided. This can be accomplished, for example, by using a multi-valued touch value, incrementing the multi-valued touch value with each subsequent touch (corresponding to step 242), and providing the touch signal when the multi-valued touch value reaches a desired number of repetitions, e.g. five.

Figure 6:
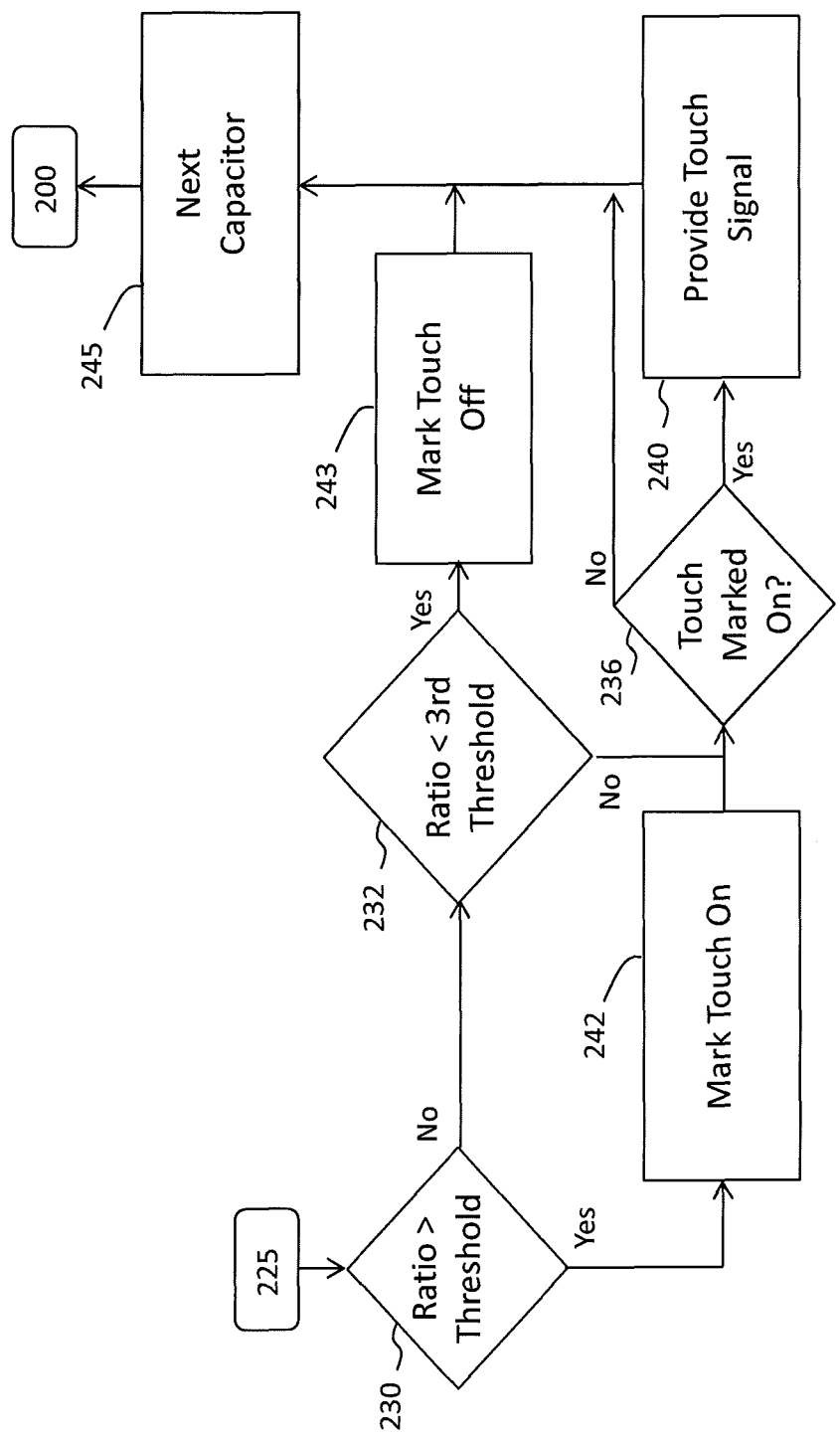

In another embodiment of the present invention, referring to FIG. 6, a different third predetermined threshold value less than the predetermined threshold value is used to indicate that a touch is no longer present. This provides hysteresis in the control system and avoids frequent switching between states when a ratio function is close to the predetermined threshold. As shown in FIG. 6, if the ratio function exceeds the predetermined threshold (230), a touch value is marked 242 on, tested 236, and a touch signal provided 240. If the ratio function does not exceed the predetermined threshold (230), the ratio function is tested 232 against a third predetermined threshold value. If the ratio function is less than the third predetermined threshold value, the touch value is marked off 243 and no touch signal is provided. If the ratio function is not less than the third predetermined threshold value, the touch value is tested 236, and, if positive, indicating that a touch was previously detected, a touch signal is provided. If negative, no touch was previously detected, and a touch signal is not provided. The next capacitor 60 is then tested 245. Thus, according to an embodiment of the present invention, controller 40 provides a second touch signal when the ratio function is less than a third predetermined threshold value after a touch signal is first provided, the third predetermined value is less than the predetermined threshold value.

The methods and algorithms described above can be combined, as will be appreciated by those skilled in the controller arts. For example, sequential touch detections are required separated over a desired time span to provide a touch signal and hysteresis is provided to indicate touch signal cessation.

In a further embodiment of the present invention, transparent dielectric layer 10 is flexible and at least one capacitor 60 changes capacitance when transparent dielectric layer 10 is flexed. In an embodiment, the change in capacitance is permanent. In an alternative embodiment, first and second electrodes 20, 30 are electrically conductive, transparent dielectric layer 10 is flexible, and at least one of first or second electrodes 20, 30 changes its electrical conductivity when transparent dielectric layer 10 is flexed. Such a change in conductivity can lead to performance changes in the rate at which capacitors 60 are charged or discharged or the capacitance of capacitors 60. In an embodiment, the change in electrical conductivity is permanent.

The baseline capacitance values for affected capacitors 60 can also change when the capacitance of capacitors 60 or the conductivity of first or second electrodes 20, 30 changes. Hence, prior-art methods that rely on the absolute capacitance value of capacitors 60 can be less reliable than the present invention when touch-screen device 5 is used.

Figure 7:
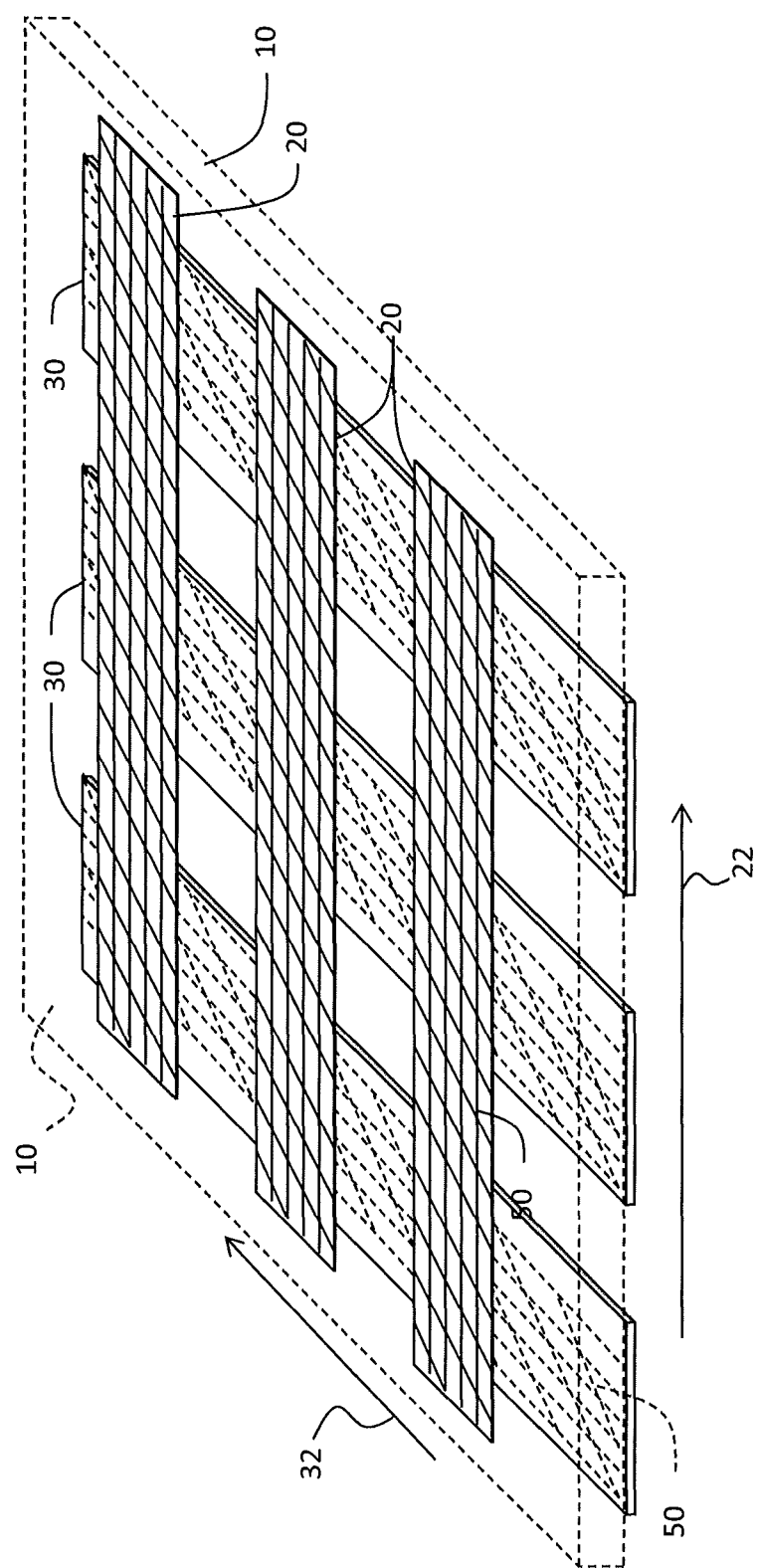
FIG. 7 is a perspective illustrating electrodes in an embodiment of the present invention.
Figure 8:
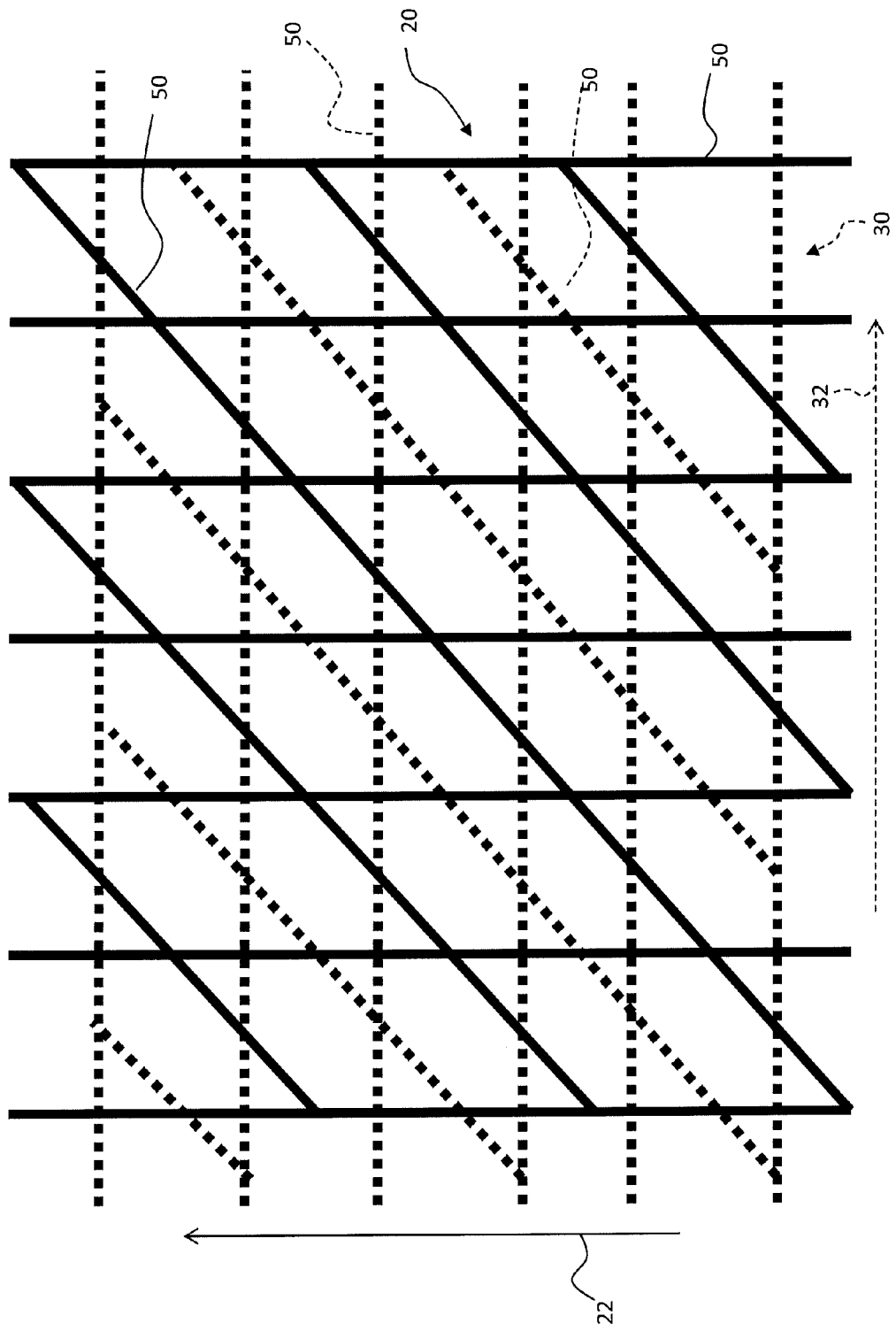
FIG. 8 is a plan view illustrating electrodes in an embodiment of the present invention.

As shown in FIGS. 7 and 8 (and also in FIG. 1), in another embodiment, first and second electrodes 20, 30 extending in first and second length directions 22, 32 respectively, each include a plurality of electrically connected micro-wires 50. Micro-wires 50 are spatially separated to provide apparently transparent first and second electrodes 20, 30. In FIGS. 1, 7, and 8 micro-wires 50 of first electrode 20 are shown with solid lines while micro-wires 50 of second electrode 30 are shown with dashed lines. Micro-wires 50 are illustrated in a rectangular mesh configuration in FIG. 1 while in FIGS. 7 and 8 straight micro-wires 50 extend in the corresponding electrode length direction (e.g. 22, 32) and angled micro-wires 50 electrically connect the straight micro-wires 50 so that micro-wires 50 of first electrode 20 are parallel to micro-wires 50 of second electrode 30. Parallel micro-wires 50 in first and second electrodes 20, can increase the capacitance of capacitor 60 formed by the overlap of first electrode 20 with second electrode 30 and improve the signal-to-noise ratio of the measured capacitance.

In another embodiment, transparent dielectric layer 10 is flexible, micro-wires 50 are electrically conductive, and the electrical conductivity of at least one micro-wire 50 changes when transparent dielectric layer 10 is flexed. In a further embodiment, the change in electrical conductivity is permanent. For example, micro-wires 50 can crack and form an electrical open. Since multiple electrically connected micro-wires 50 are present in first or second electrode 20, 30, such a change in a single micro-wire 50 need not cause first or second electrode 20, 30 to fail.

Figure 9A:
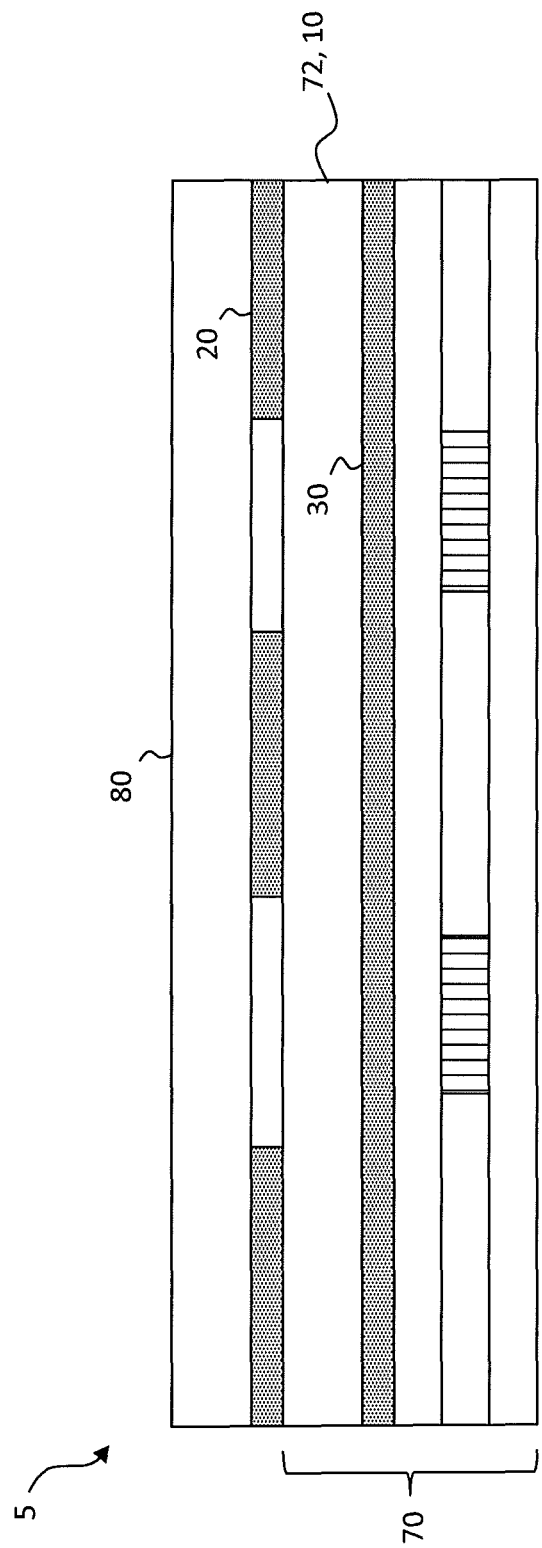
FIGS. 9A and 9B are cross sections of embodiments of the present invention.
Figure 9B:
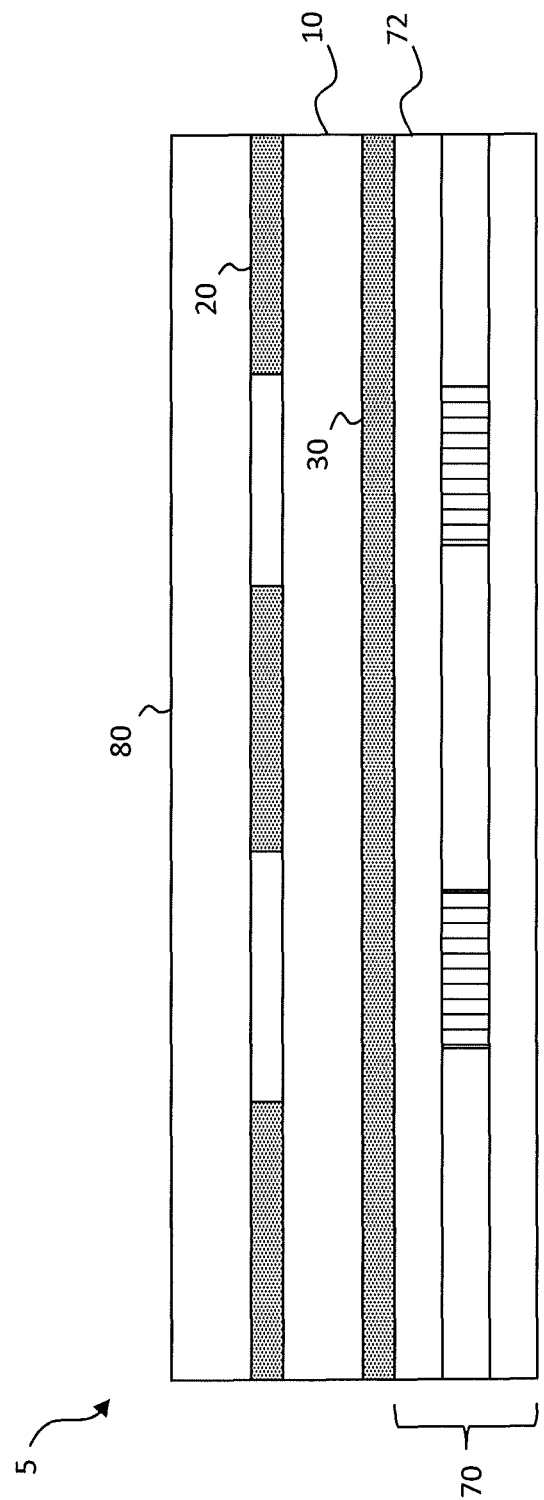

Referring to FIGS. 9A and 9B, in alternative embodiments, touch-screen device 5 includes a display 70 having a cover or substrate 72. First or second electrodes 20, 30 are formed on cover or substrate 72 or on layers formed on cover or substrate 72. In the embodiment of FIG. 9A, transparent dielectric layer 10 is cover or substrate 72 and first and second electrodes 20, 30 are located on opposing sides of cover or substrate 72. In the embodiment of FIG. 9B, transparent dielectric layer 10 is separate from cover or substrate 72 and second electrode 30 is located over cover or substrate 72 outside the display 70 and between cover or substrate 72 and transparent dielectric layer 10. A protective cover 80 is provided over first electrodes 20 in both alternative embodiments.

Transparent dielectric layer 10 of the present invention can be a substrate and can include any dielectric material capable of providing a supporting surface on which first or second electrodes 20, 30 or micro-wires 50 can be formed and patterned. Substrates made of glass or plastics can be used and are known in the art together with methods for providing suitable surfaces. Transparent dielectric layer 10 is substantially transparent, for example having a transparency of greater than 90%, 80%, 70%, or 50% in the visible range of electromagnetic radiation.

First or second electrodes 20, 30 can be formed directly on transparent dielectric layer 10 or over transparent dielectric layer 10 on layers formed on transparent dielectric layer 10. The words "on", "over", or the phrase "on or over" indicate that micro-wires 50 of first or second electrodes 20, 30 of the present invention can be formed directly on transparent dielectric layer 10, on layers formed on transparent dielectric layer 10, or on other layers or on another substrate located so that first electrodes 20 are over transparent dielectric layer 10. Likewise, second electrodes 30 can be formed under or beneath transparent dielectric layer 10 or on another substrate located so that second electrodes 30 are under transparent dielectric layer 10. The words "on", "under", "beneath" or the phrase "on or under" indicate that micro-wires 50 of first or second electrodes 20, of the present invention can be formed directly on transparent dielectric layer 10, on layers formed on transparent dielectric layer 10, or on other layers or another substrate located so that first electrodes 20 are over transparent dielectric layer 10 and second electrodes 30 are under transparent dielectric layer 10. "Over" or "under", as used in the present disclosure, are simply relative terms for layers located on or adjacent to opposing surfaces of transparent dielectric layer 10. By flipping transparent dielectric layer 10 and related structures or substrates over as a unit, layers that are over transparent dielectric layer 10 become under transparent dielectric layer 10 and layers that are under transparent dielectric layer 10 become over transparent dielectric layer 10.

First or second electrodes 20, 30 can be formed on transparent substrates separate from transparent dielectric layer 10. Alternatively, first or second electrodes 20, 30 can be formed on transparent dielectric layer 10, or some combination of transparent dielectric layer 10 and other transparent substrates. Micro-wires 50 for each of first and second transparent electrodes 20, 30 can be formed on opposing sides of the same transparent substrate (e.g. as shown in FIG. 1) or on facing sides of separate transparent substrates or some combination of those arrangements.

The length direction of first or second electrode 20, 30 (e.g. first and second length direction 22, 32, respectively) is typically the direction of the greatest spatial extent of the corresponding first or second electrode 20, 30 over transparent dielectric layer 10 over or under which first or second electrodes 20, are located. Electrodes located on, over, or under substrates are typically rectangular in shape, or formed of rectangular elements, with a length and a width, where the length is much greater than the width. See, for example, the prior-art illustrations of FIG. 12. Electrodes are generally used to conduct electricity from a first point on a substrate to a second point and the direction of the electrode from the first point to the second point can be the length direction of the electrode.

Figure 10:
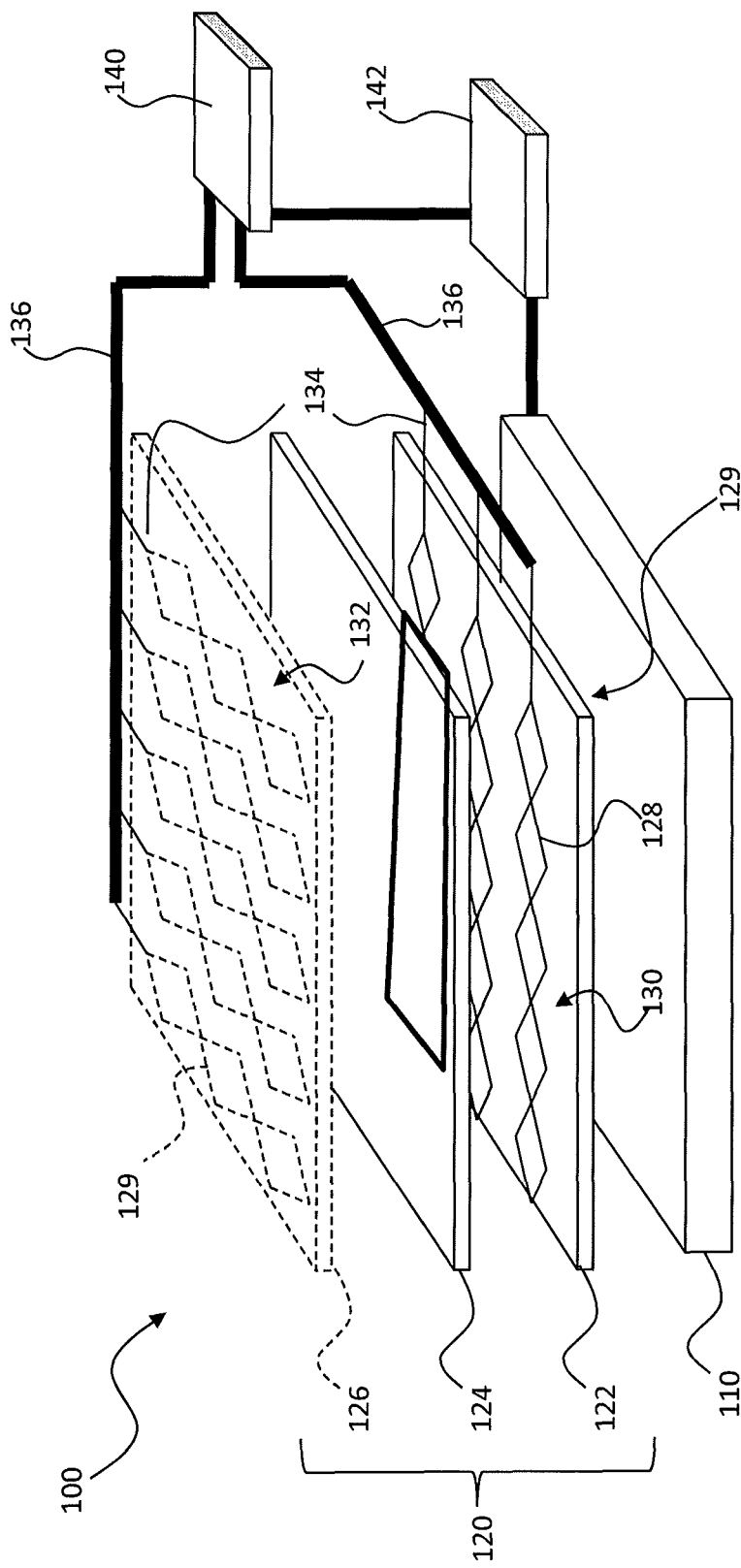
FIG. 10 is an exploded perspective illustrating a prior-art mutual capacitive touch screen having adjacent pad areas in conjunction with a display and controllers.
Figure 11:
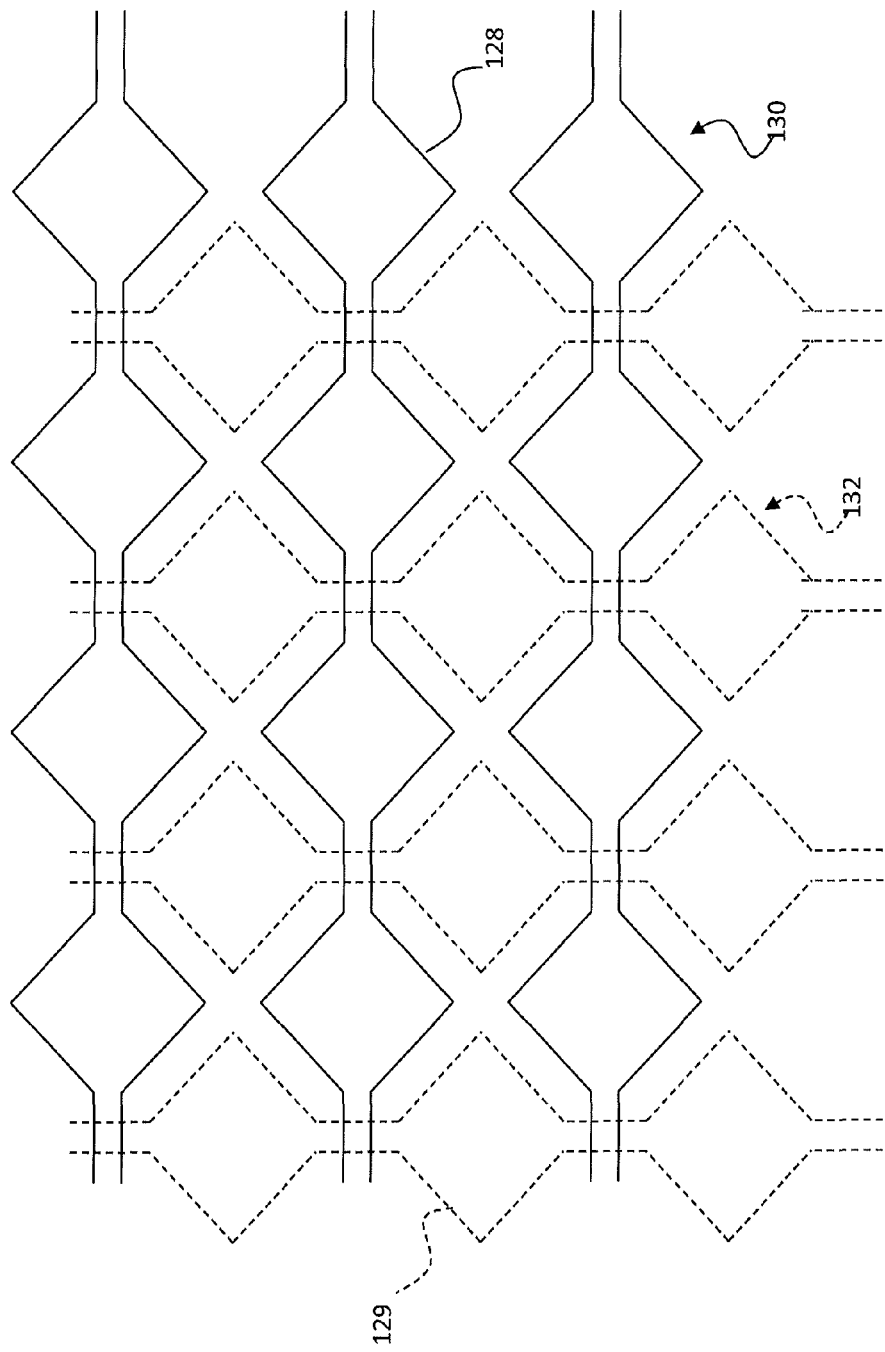
FIG. 11 is a schematic illustrating prior-art pad areas in a capacitive touch screen.
Figure 12:
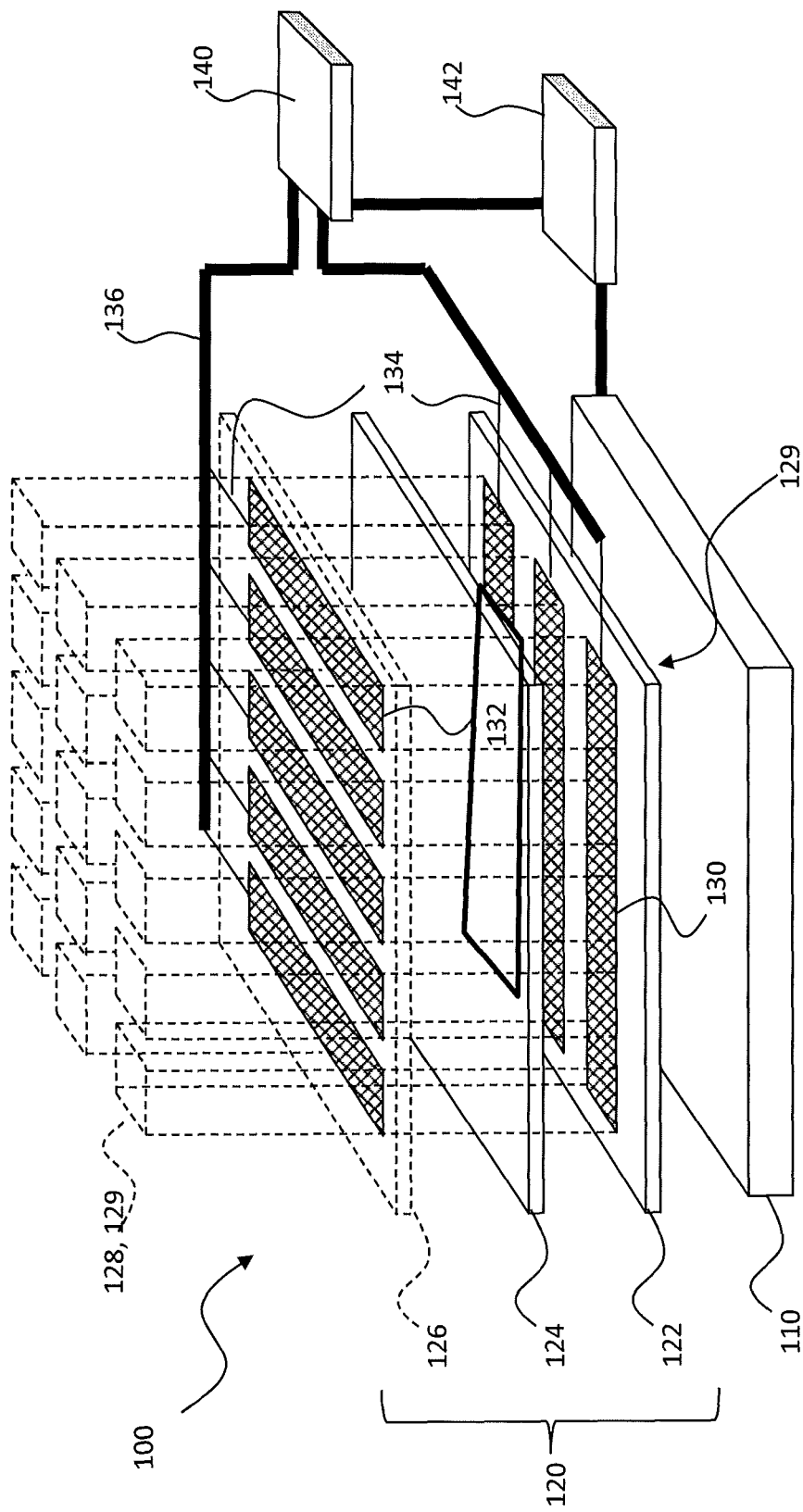
FIG. 12 is an exploded perspective illustrating a prior-art mutual capacitive touch screen having overlapping pad areas in conjunction with a display and controllers.
Figure 13:
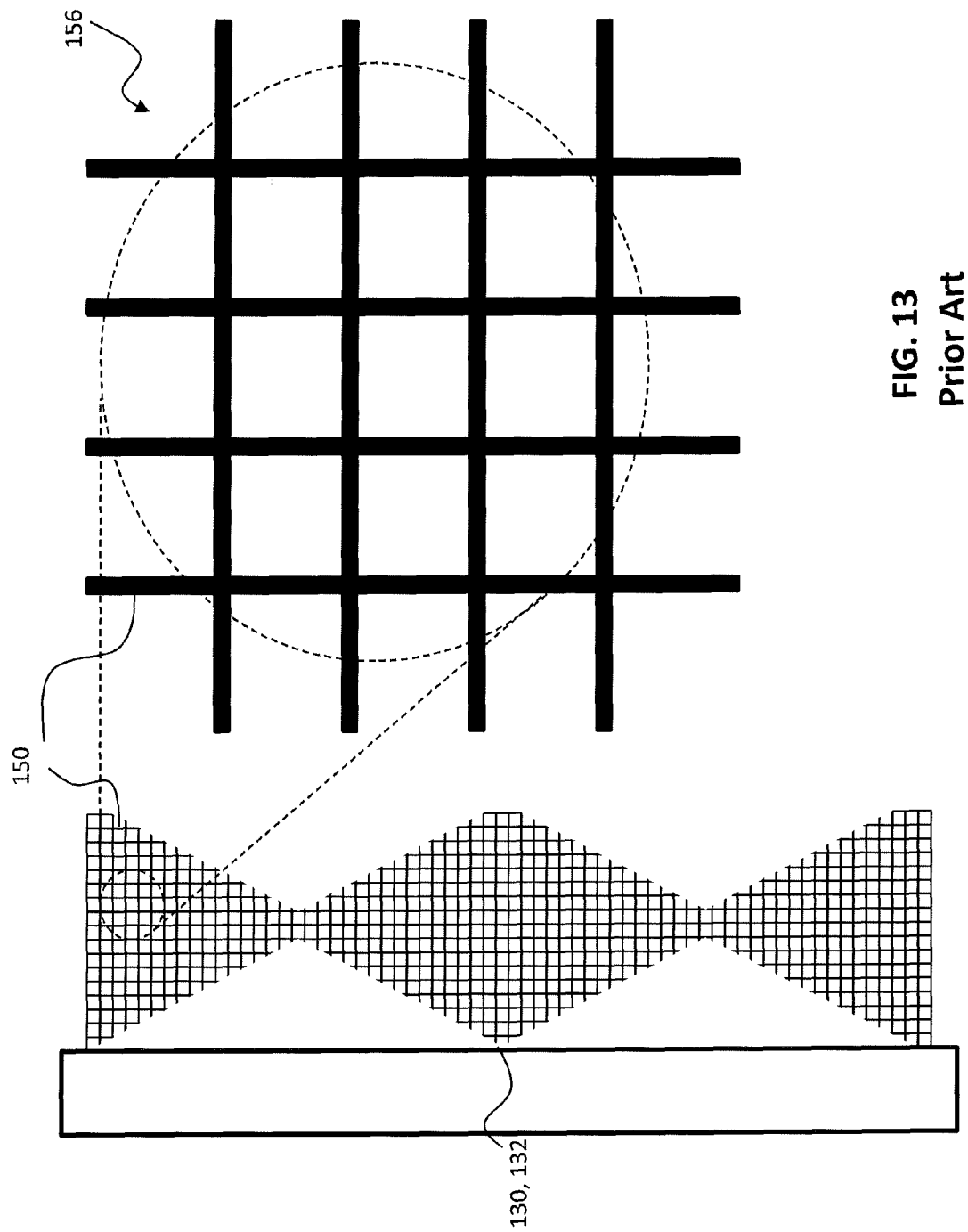
FIG. 13 is a schematic illustrating prior-art micro-wires in an apparently transparent electrode.
Figure 14:
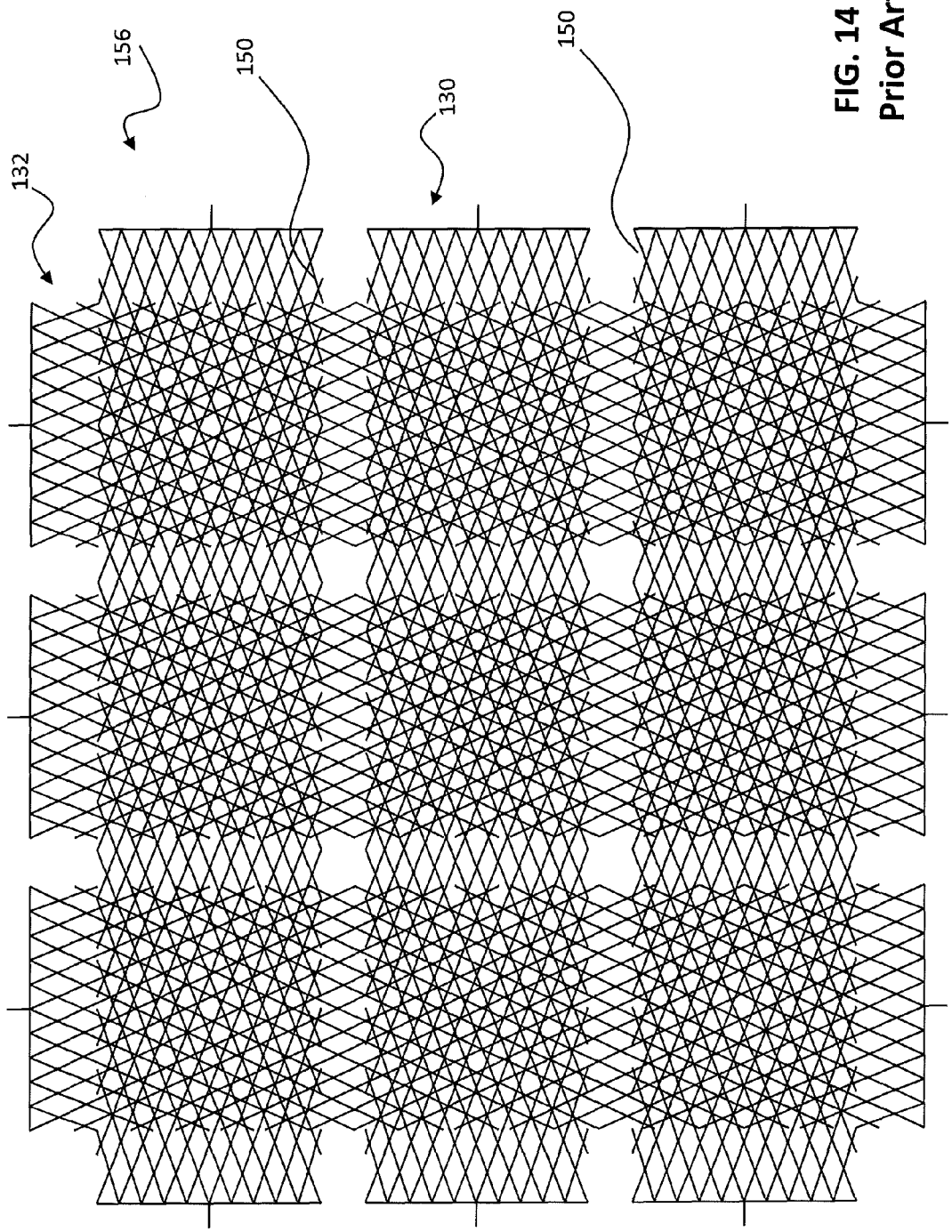
FIG. 14 is a schematic illustrating prior-art micro-wires arranged in two arrays of orthogonal transparent electrodes.

Touch-screen device 5 of the present invention can be used in a touch-screen and display system 100, such as illustrated in the perspective of FIG. 10 or 12. Wires 134, buss connections 136, and display controller 142 of FIG. 10 can be used as described with reference to FIG. 10. In response to a voltage differential provided between electrodes on either side of transparent dielectric layer 10, an electrical field is formed and a capacitance produced. Touch-screen controller 40 (FIG. 1) sequentially energizes first and second electrodes 20, 30 (e.g. with a voltage differential) and senses a capacitance. The capacitance of overlapping electrode areas (capacitors 60) is changed in the presence of a conductive element, such as a finger or conductive stylus. The change in capacitance is detected and indicates a touch. By providing a controller 40 of the present invention, more robust touch sensing can be provided, especially in the presence of environmental variability and particular due to device wear, for example from use.

In an example and non-limiting embodiment of the present invention, each micro-wire 50 is 5 microns wide and separated from neighboring micro-wires 50 in an electrode by a distance of 50 microns, so that the transparent electrode (e.g. first or second electrode 20, 30) formed by micro-wires 50 is 90% transparent. As used herein, transparent refers to elements that transmit at least 50% of incident visible light, preferably 80%, or at least 90%. Micro-wires 50 can be arranged in a micro-pattern 156 that is unrelated to the pattern of first or second electrodes 20, 30. Micro-patterns 156 other than those illustrated in the Figures can be used in other embodiments and the present invention is not limited by the pattern of first or second electrodes 20, 30 or micro-wires 50.

Micro-wires 50 can be metal, for example silver, gold, aluminum, nickel, tungsten, titanium, tin, or copper or various metal alloys including, for example silver, gold, aluminum, nickel, tungsten, titanium, tin, or copper. Micro-wires 50 are, for example formed in a thin metal layer composed of highly conductive metals. Other conductive metals or materials can be used. Micro-wires 50 can be, but need not be, opaque. Micro-wires 50 can be formed by patterned deposition of conductive materials or of patterned precursor materials that are subsequently processed, if necessary, to form a conductive material. Suitable methods and materials are known in the art, for example, inkjet deposition or screen printing with conductive inks. Alternatively, micro-wires 50 are formed by providing a blanket deposition of a conductive or precursor material and patterning and curing, if necessary, the deposited material to form a micro-pattern 156 of micro-wires 50. Photo-lithographic and photographic methods are known to perform such processing. The present invention is not limited by the micro-wire materials or by methods of forming a pattern of micro-wires 50 on a supporting substrate surface.

Alternatively, micro-wires 50 can include cured or sintered metal particles such as nickel, tungsten, silver, gold, titanium, or tin or alloys such as nickel, tungsten, silver, gold, titanium, or tin. Other materials or methods for forming micro-wires 50 can be employed and are included in the present invention.

As used herein, micro-wires 50 in first or second electrodes 20, 30 are micro-wires 50 formed in a micro-wire layer that forms a conductive mesh of electrically connected micro-wires 50. If a transparent substrate on which micro-wires 50 are formed is planar, for example, a rigid planar substrate such as a glass substrate, micro-wires 50 in a micro-wire layer are formed in, or on, a common plane as a conductive, electrically connected mesh. If a transparent substrate is flexible and curved, for example a plastic substrate, micro-wires 50 in a micro-wire layer are a conductive, electrically connected mesh that is a common distance from a surface of the flexible, transparent substrate.

In embodiments of the present invention, micro-wires 50 are made by depositing an unpatterned layer of material and then differentially exposing the layer to form the different micro-wire 50 micro-patterns 156. For example, a layer of curable precursor material is coated over a substrate and pattern-wise exposed. The material is exposed in a common step or in different steps. A variety of processing methods can be used, for example photo-lithographic or silver halide methods. The materials can be differentially pattern-wise exposed and then processed.

A variety of materials can be employed to form patterned micro-wires 50 including resins that can be cured by cross-linking wave-length-sensitive polymeric binders and silver halide materials that are exposed to light. Processing can include both washing out residual uncured materials and curing or exposure steps.

In an embodiment, a precursor layer includes conductive ink, conductive particles, or metal ink. The exposed portions of the precursor layer are cured to form micro-wires 50 (for example by exposure to patterned laser light to cross-link a curable resin) and the uncured portions removed. Alternatively, unexposed portions of the first and second micro-wire layers are cured to form micro-wires 50 and the cured portions removed.

In another embodiment of the present invention, the precursor layers are silver salt layers. The silver salt can be any material that is capable of providing a latent image (that is, a germ or nucleus of metal in each exposed grain of metal salt) according to a desired pattern upon photo-exposure. The latent image can then be developed into a metal image. For example, the silver salt can be a photosensitive silver salt such as a silver halide or mixture of silver halides. The silver halide can be, for example, silver chloride, silver bromide, silver chlorobromide, or silver bromoiodide.

According to some embodiments, the useful silver salt is a silver halide (AgX) that is sensitized to any suitable wave-length of exposing radiation. Organic sensitizing dyes can be used to sensitize the silver salt to visible or IR radiation, but it can be advantageous to sensitize the silver salt in the UV portion of the electromagnetic spectrum without using sensitizing dyes.

Processing of AgX materials to form conductive traces typically involves at least developing exposed AgX and fixing (removing) unexposed AgX. Other steps can be employed to enhance conductivity, such as thermal treatments, electroless plating, physical development and various conductivity enhancing baths, e.g., as described in U.S. Pat. No. 3,223,525.

To achieve transparency, the total area occupied by micro-wires 50 can be less than 15% of the area of first or second electrode 20, 30.

In an embodiment, the first and second precursor material layers can each include a metallic particulate material or a metallic precursor material, and a photosensitive binder material.

In any of these cases, the precursor material is conductive after it is cured and any needed processing completed. Before patterning or before curing, the precursor material is not necessarily electrically conductive. As used herein, precursor material is material that is electrically conductive after any final processing is completed and the precursor material is not necessarily conductive at any other point in the micro-wire formation process.

Methods and device for forming and providing substrates, coating substrates, patterning coated substrates, or pattern-wise depositing materials on a substrate are known in the photo-lithographic arts. Likewise, tools for laying out electrodes, conductive traces, and connectors are known in the electronics industry as are methods for manufacturing such electronic system elements. Hardware controllers for controlling touch screens and displays and software for managing display and touch screen systems are well known and can be employed with the present invention. Tools and methods of the prior art can be usefully employed to design, implement, construct, and operate the present invention. Methods, tools, and devices for operating capacitive touch screens can be used with the present invention.

Touch-screen device 5 of the present invention can be usefully employed with display devices of the prior art. Such devices can include, for example, OLED displays and lighting, LCD displays, plasma displays, inorganic LED displays and lighting, electrophoretic displays, electrowetting displays, dimming mirrors, smart windows, transparent radio antennae, transparent heaters and other touch screen devices such as resistive touch screen devices.

The invention has been described in detail with particular reference to certain embodiments thereof, but it will be understood that variations and modifications can be effected within the spirit and scope of the invention.

PARTS LIST 5 touch-screen device
10 transparent dielectric layer, substrate
11 first side
12 second side
20 first electrode
22 first length direction
30 second electrode
32 second length direction
40 controller
42 circuits
44 memory
50 micro-wires
60 capacitor
70 display
72 cover or substrate
80 protective cover
100 touch-screen and display system
110 display
120 touch screen
122 first transparent substrate
124 transparent dielectric layer
126 second transparent substrate
128 first pad area
129 second pad area
130 first transparent electrode
132 second transparent electrode
134 wires
136 buss connections
140 touch-screen controller
142 display controller
150 micro-wire
156 micro-pattern
200 energize capacitor step
205 measure baseline capacitance step
210 store baseline capacitance step
215 test capacitors done step
220 measure present capacitance step
225 calculate ratio step
230 test ratio greater than threshold value step
231 test ratio less than second threshold value step
232 test ratio less than third threshold value step
235 touch detected step
236 test touch value step
240 provide touch signal step
241 turn off touch signal step
242 mark touch on step
243 mark touch off step
245 next capacitor step
300 calibration step
305 operation step
310 test update baseline step

The invention claimed is:

1. A touch-screen device, comprising:
a transparent dielectric layer having a first side and a second side opposite and substantially parallel to the first side;
a plurality of first electrodes extending in a first length direction located over the first side,
a plurality of second electrodes having a second length direction different from the first length direction located under the second side so that the first electrodes overlap the second electrodes to form an array of capacitors;
a controller having a memory and circuits that provide electrical signals to the first and second electrodes, the circuits performing the following functions:
energizing each capacitor, measuring the baseline capacitance of each capacitor, and storing the baseline capacitance of each capacitor in the memory; and
repeatedly energizing each capacitor and measuring the present capacitance of each capacitor; and
the controller calculating a ratio function between the present capacitance and the corresponding stored baseline capacitance for each capacitor and providing a touch signal when the ratio function exceeds a predetermined threshold value.

2. The touch-screen device of claim 1, wherein the first electrodes are orthogonal to the second electrodes.

3. The touch-screen device of claim 1, wherein the first or second electrodes are formed on the transparent dielectric layer or on layers formed on the dielectric layer.

4. The touch-screen device of claim 1, further including a display having a cover or substrate and wherein the first or second electrodes are formed on the cover or substrate or on layers formed on the cover or substrate or wherein the transparent dielectric layer is the cover or substrate.

5. The touch-screen device of claim 1, wherein the transparent dielectric layer is flexible and at least one capacitor changes capacitance when the transparent dielectric layer is flexed.

6. The touch-screen device of claim 1, wherein the change in capacitance is permanent.

7. The touch-screen device of claim 1, wherein the first and second electrodes are electrically conductive, the transparent dielectric layer is flexible, and at least one of the first or second electrodes changes its electrical conductivity when the transparent dielectric layer is flexed.

8. The touch-screen device of claim 7, wherein the change in electrical conductivity is permanent.

9. The touch-screen device of claim 1, wherein the circuits further repeatedly energize each capacitor, measure an updated capacitance of each capacitor, and store the updated baseline capacitance in the memory.

10. The touch-screen device of claim 1, wherein the controller provides the touch signal when the ratio function exceeds the predetermined threshold value two or more times sequentially.

11. The touch-screen device of claim 10, wherein the controller provides the touch signal when the present capacitance is measured at two different times separated by at least one millisecond.

12. The touch-screen device of claim 1, wherein the controller provides the touch signal when the ratio function is less than a second predetermined threshold value greater than the predetermined threshold value.

13. The touch-screen device of claim 12, wherein the controller provides a second touch signal when the ratio function is less than a third predetermined threshold value after a touch signal is first provided, the third predetermined threshold value being less than the predetermined threshold value.

14. The touch-screen device of claim 13, wherein the controller provides the touch signal when the present capacitance is measured at two different times separated by at least one millisecond.

15. The touch-screen device of claim 11, wherein the controller provides the touch signal when the present capacitance is measured at two different times separated by at least one millisecond.

16. The touch-screen device of claim 1, wherein the first and second electrodes each have a plurality of electrically connected micro-wires.

17. The touch-screen device of claim 15, wherein one or more of the micro-wires of the first electrode are parallel to the micro-wires of the second electrode.

18. The touch-screen device of claim 15, wherein the transparent dielectric layer is flexible, the micro-wires are electrically conductive, and the electrical conductivity of at least one micro-wire changes when the transparent dielectric layer is flexed.

19. The touch-screen device of claim 18, wherein the change in electrical conductivity is permanent.

* * * * *